(12) United States Patent
Nilsson

(10) Patent No.: US 6,700,530 B1
(45) Date of Patent: Mar. 2, 2004

(54) CIRCUIT AND METHOD FOR GENERATION OF TRIGGER SIGNALS

(75) Inventor: Leif Nilsson, Linköping (SE)

(73) Assignee: Saab Marine Electronics AB, Göteborg (SE)

( * ) Notice: Subject to any disclaimer, the term of this patent is extended or adjusted under 35 U.S.C. 154(b) by 0 days.

(21) Appl. No.: 10/281,280

(22) Filed: Oct. 28, 2002

(51) Int. Cl.$^7$ ............................. G01S 13/08; G01S 7/28
(52) U.S. Cl. ..................... 342/124; 342/175; 342/82
(58) Field of Search ........................... 342/124, 175, 342/82, 84, 85, 88

(56) References Cited

U.S. PATENT DOCUMENTS

| | | | | |
|---|---|---|---|---|
| 3,713,145 A | * | 1/1973 | Butler et al. | 342/51 |
| 3,792,471 A | * | 2/1974 | Kingsbury | 342/97 |
| 4,171,514 A | * | 10/1979 | Faxon | 342/202 |
| 4,214,240 A | * | 7/1980 | Weiss | 342/16 |
| 4,316,193 A | * | 2/1982 | Jones et al. | 342/458 |
| 4,517,567 A | * | 5/1985 | Lee et al. | 342/202 |
| 4,975,703 A | * | 12/1990 | Delisle et al. | 342/21 |
| 5,026,156 A | * | 6/1991 | Bayston et al. | 356/5.01 |
| 5,563,605 A | | 10/1996 | McEwan | 342/202 |
| 5,614,912 A | * | 3/1997 | Mitchell | 342/146 |
| 6,055,287 A | | 4/2000 | McEwan | 375/376 |
| 6,072,427 A | | 6/2000 | McEwan | 342/175 |
| 6,108,376 A | * | 8/2000 | Morgan et al. | 375/239 |
| 6,191,724 B1 | | 2/2001 | McEwan | 342/21 |
| 6,201,424 B1 | | 3/2001 | Harrison | |
| 6,504,409 B1 | * | 1/2003 | Laletin | 327/175 |
| 2001/0052805 A1 | | 12/2001 | Kim | |
| 2003/0151453 A1 | * | 8/2003 | Laletin | 327/551 |

OTHER PUBLICATIONS

"A CMOS integrated timing discriminator circuit for fast scintillation counters", Jochmann, M.W.; Nuclear Science Symposium, 1997. IEEE , Nov. 9–15, 1997 Page(s): 13–17 vol. 1.*

"Temperature–insensitive integrable multivibrator", Bellomo, A.F.; Solid–State Circuits, IEEE Journal of , vol.: 6 Issue: 3, Ju 1971 Page(s): 125–127.*

"Polyphase multivibrators", Harada, K.; Magnetics, IEEE Transactions on , vol.: 3 Issue: 2, Jun. 1967 Page(s): 117–124.*

* cited by examiner

*Primary Examiner*—John B. Sotomayor
(74) *Attorney, Agent, or Firm*—Swidler Berlin Shereff Friedman, LLP

(57) ABSTRACT

The present invention relates to a circuit and method for generation of trigger signals for a radar level gauging systems. A pulse-width modulator, has an input connected to a pulse-repetition-frequency generating oscillator. A monostable multivibrator, has an input connected to an output of the pulse-width modulator. First and second integrators are connected to an output of the pulse-width modulator and the monostable multivibrator respectively. A voltage summation element, is connected to an output of the first and second integrators respectively and at least one control signal input. A servo regulator provides a control loop between an output of the voltage summation element and a control port of the pulse-width modulator. A reference clock output is provided at the output of the monostable multivibrator and a second clock output is provided at the output of the pulse-width modulator.

17 Claims, 2 Drawing Sheets

CIRCUIT AND METHOD FOR GENERATION OF TRIGGER SIGNALS

TECHNICAL FIELD

The present patent application relates to a timing circuit for generation of trigger signals for a radar level gauging system. The present patent application further relates to a method for generation of trigger signals for a radar level gauging system. The invention can be used to generate a reference transmit clock and a swept-delay receive clock for sampling-type fluid level sensing radar systems.

BACKGROUND OF THE INVENTION

Non-contact range measurement pulse-echo radar systems for fluid level sensing in tanks and vats typically consist of a transmitter which is arranged to radiate short duration radio frequency (RF) bursts via a highly directional antenna. After a delay a receiver is gated at a particular point in time. The timing of gating of the receiver is typically swept across a range of delays in a matter of milliseconds, such that a video output of the receiver can be provided as a scan like waveform. This waveform replicates occurring echoes on a real-time scale, corresponding to the physical distances represented by the echoes as the exact delay of a received echo pulse in relation to the transmitted pulse provides a measure of the distance to the reflecting object.

Highly accurate timing of the transmitted RF bursts and the gating of the receiver is necessary in order to be able to obtain high accuracy range information.

A precision digital pulse phase generator timing circuit is previously known through U.S. Pat. No. 5,563,605. This timing generator comprises a crystal oscillator connected to provide an output reference pulse. A resistor-capacitor combination is connected to provide a variable-delay output pulse from an input connected to the crystal oscillator. A phase monitor is connected to provide duty-cycle representations of the reference and variable-delay output pulse phase. An operational amplifier drives a control voltage to the resistor-capacitor combination according to currents integrated from the phase monitor and injected into summing junctions. A digital-to-analog converter injects a control current into the summing junctions according to an input digital control code. A servo equilibrium results that provides a phase delay of the variable-delay output pulse to the output reference pulse that linearly depends on the input digital control code.

However, the timing circuit previously known through U.S. Pat. No. 5,563,605, employs a NAND gate as a phase comparator in a delay locked loop configuration, which NAND gate must operate with sufficient clock timing difference to allow for the propagation of a sufficiently wide pulse through it. This presents a problem for radar circuits that must operate down to a zero range, such as for fluid level measurement in a tank, since the delay hereby introduced makes it virtually impossible to detect close range echoes. Furthermore, this previously known circuit has the disadvantage of having significant phase jitter or instability in the sample clock. This is a result of performance limitations of the high speed comparator required as part of the phase delay generator.

SUMMARY OF THE INVENTION

One object of the invention is to provide an improved timing circuit for generation of trigger signals for a radar level gauging system.

A further object of the present invention is to provide a precision timing circuit for generation of trigger signals for a radar level gauging system which does not rely on tolerances or matching of discrete components.

Another object of the present invention is to provide a precision timing circuit for generation of trigger signals for a radar level gauging system in which the relationship between the transmit clock and a swept-delay receive clock will remain the same, irrespective of external influences.

Briefly, a timing circuit embodiment of the present invention comprises a pulse-width modulator, having an input connected to a pulse-repetition-frequency generating oscillator. A monostable multivibrator, having an input connected to an output of the pulse-width modulator. First and second integrators connected to an output of the pulse-width modulator and the monostable multivibrator respectively. A voltage summation element, connected to an output of the first and second integrators respectively and at least one control signal input. A servo regulator providing a control loop between an output of the voltage summation element and a control port of the pulse-width modulator. A servo equilibrium results such that a reference clock output is provided at the output of the monostable multivibrator and a second clock output is provided at the output of the pulse-width modulator, where the phase delay of the of the second clock output to the reference clock output linearly depends on the control signal input.

A further object of the present invention is to provide an improved method for generation of trigger signals for a radar level gauging system.

Briefly, a method for generation of trigger signals for a radar level gauging system comprises the following steps. Providing a pulse-repetition-frequency clock pulse to a pulse width modulator. Using a first edge of an output pulse from the pulse width modulator to trigger a monostable multivibrator to output a fixed width pulse having one common edge with the first edge of the output pulse from the pulse width modulator. Obtaining average voltages related to the duty cycles of the output pulses from the pulse width modulator and the monostable multivibrator. Controlling the delay of the output pulse from the pulse width modulator with respect to the output pulse from the monostable multivibrator by regulating the average voltages.

An advantage of the circuit and method in accordance with the present invention compared to prior art circuits and methods is that both the initial phase and the variable phase or delay difference between the triggering edges of the output signals are independently and accurately regulated to definable values, without having to rely on tolerances or matching of discrete components, such as resistors or capacitors.

A further advantage of the circuit in accordance with the present invention is that relationship between the transmit clock and a swept-delay receive clock will remain the same, irrespective of external influences, such as ambient temperature, influencing the components thereof.

DESCRIPTION OF DRAWINGS

In the following, the invention will be described in greater detail with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
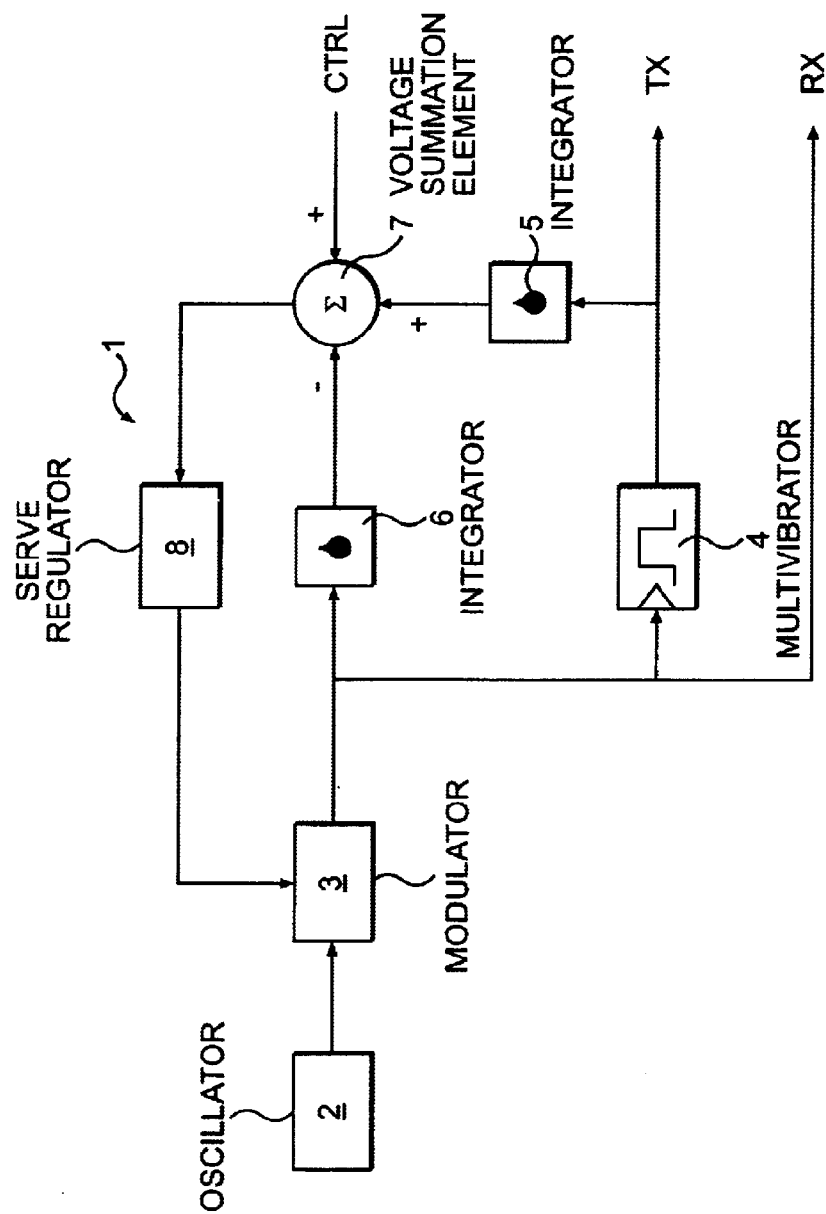
FIG. 1 illustrates schematically a block diagram of a timing circuit according to a preferred embodiment of the present invention.

In the following a preferred embodiment will be described with reference to a timing circuit generally designated 1 as illustrated by the schematic block diagram of FIG. 1. The timing circuit 1 is arranged to provide a receiver control output clock pulse RX that is precisely delayed from a transmitter control output clock pulse TX according to a control signal input CTRL, e.g. a ramp sweep input signal. Further the RX and TX clock pulses are arranged to have the same frequency and a respective corresponding clock edge locked to each other.

In a radar fluid level sensing device, a transmitter generates a sequence of pulses which are directed towards a fluid surface, and the transmitter control output clock pulse TX control the transmitted pulses. A swept range gated receiver, triggered by the receiver control output clock pulse RX, receives reflected signals from the fluid surface whereby the fluid level can be determined.

The present invention is a precision high speed voltage controlled delay locked loop timing circuit 1 for generating trigger signals to be used in a device, such as a time domain fluid level sensing radar device, utilizing time expansion techniques where the triggering edge of the receiver control output clock pulse RX typically is swept linearly compared with the triggering edge of the transmitter control reference clock pulse TX. The linearity of the generated delay versus the control signal CTRL is ensured by using a simple servo regulator.

The timing circuit 1 comprises an oscillator 2 arranged to output a pulse sequence, which oscillator 2 is connected to the input of a pulse width modulator 3. The pulse width modulator 3 having an input, an output and a control port and being responsive to a voltage at its control port for providing different pulse width output clock pulses triggered by the oscillator 2. The output of the pulse width modulator 3 provides a variable duty-cycle receiver control output clock RX.

A monostable multivibrator 4, one-shot generator, has an input connected to the output of the pulse width modulator 3 and is arranged to be triggered by a leading edge of the clock pulse RX output by the pulse width modulator 3 to provide a fixed pulse width output clock pulse TX. The output of the monostable multivibrator 4 provides a constant duty-cycle transmitter control output clock TX.

Inputs of first and second independent integrators 5, 6 are connected to the outputs of the pulse width modulator 3 and the monostable multivibrator 4 respectively. These integrators 5, 6 can be realized as a pair of resistors providing for integration of the respective clock pulses RX and TX. The outputs of the first and second integrators 5, 6 are connected to a voltage summation element 7 and provides respective voltages that are proportional to the duty-cycles of the respective RX and TX clock pulses. The voltage summation element 7 is arranged to handle the voltages outputs by the first and second integrators 5, 6 with different signs (+/−), i.e. subtracting one from the other, as is evident form FIG. 1. Further, at least one control signal input CTRL is provided to the voltage summation element 7, allowing for injection of external control voltages. The output of the voltage summation element 7 provides a control loop to the control port of the pulse width modulator 3 via a servo regulator 8. The servo regulator 8 regulates the delay of the pulse width modulator 3 to balance the integrated voltages against any externally applied control voltages. The delay between the triggering edges of the TX and RX clock pulses is thereby precisely controlled by external control voltage inputs.

The pulse width modulator 3 is arranged to output a variable duty cycle clock pulse, depending on the voltage provided to the control port thereof via the servo regulator 8. In the absence of control signal input voltages to the voltage summation element 7, the circuit 1 is arranged to stabilize such that the duty-cycle of a clock pulse RX output by the pulse-width modulator 3 precisely matches the duty cycle of a clock pulse TX output by the monostable multivibrator 4.

The delay generation is indirectly accomplished by an independent proportional regulation of the duty-cycle level of the delayed output clock pulse RX while the initial delay or phase difference between the corresponding clock output edges is simultaneously and automatically regulated to zero. As will be obvious to the person skilled in the art the initial delay or phase difference between the corresponding clock output edges can alternatively also be regulated to any desired positive or negative phase difference. The accuracy of the initial delay is ensured by the usage of the monostable multivibrator 4 generating a fixed pulse width that can be long enough not to cause any significant errors due to limitations in rise time and potential ringings.

A suitable control signal CTRL is arranged to linearly control the skew time of the clock pulse RX output by the pulse-width modulator 3 from the clock pulse TX output by the monostable multivibrator 4. The triggering edge of the TX clock pulse is fixed and the triggering edge of the RX clock pulse sweeps through a range of delays. When external control voltages are applied to the control signal inputs CTRL of the voltage summation element 7, the duty-cycle of the clock pulse RX output by the pulse-width modulator 3 must adapt to maintain loop equilibrium. One such control signal usually is a linear ramp, e.g. a 0 to 5-volt linear ramp, derived e.g. from a precision linear ramp circuit. Thus the circuit 1 provides a receiver gate triggering clock pulse RX that is precisely delayed from a transmitter triggering clock pulse TX output according to a control signal CTRL input value.

Figure 2:
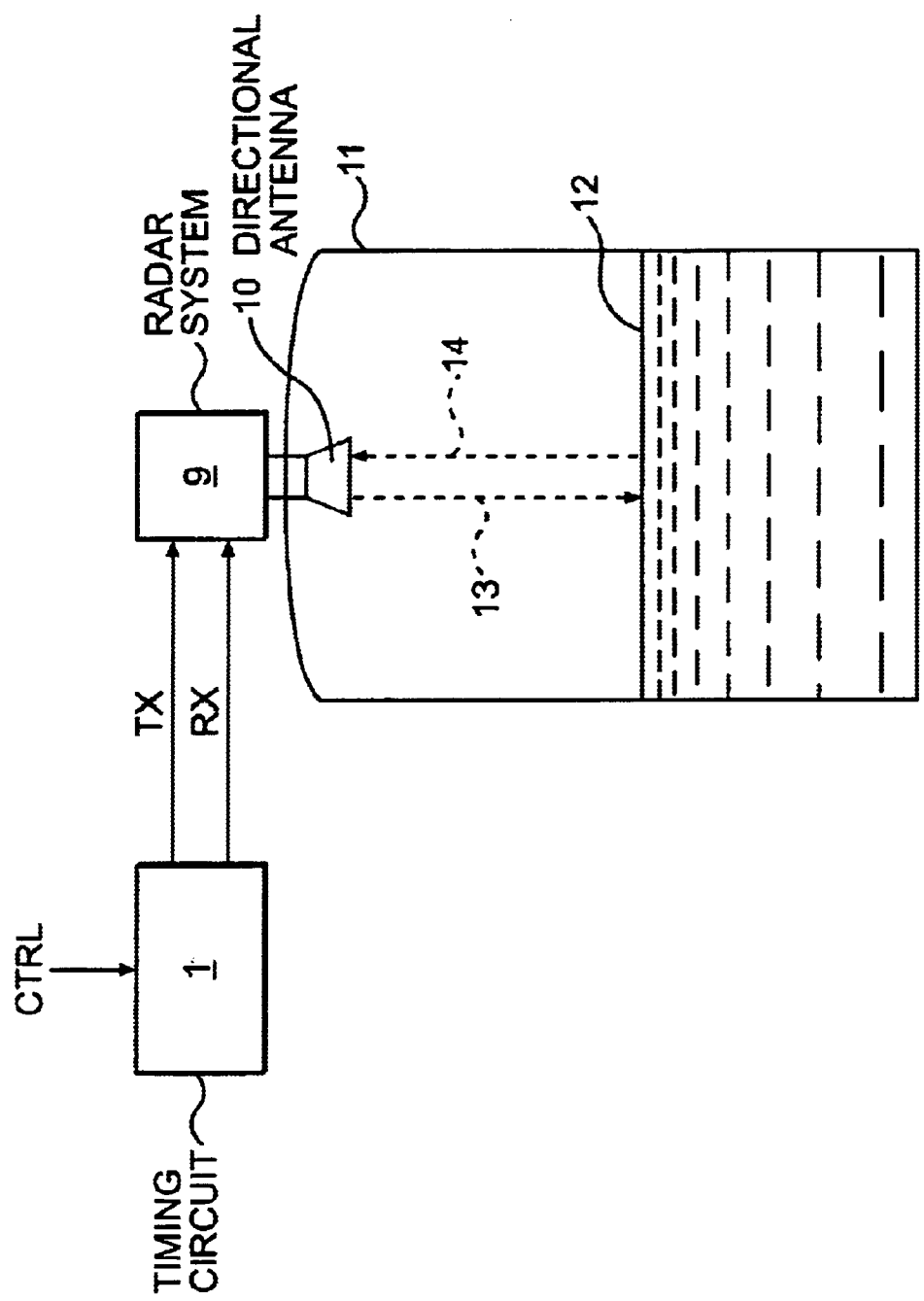
FIG. 2 is a simplified schematic view of how the timing circuit of FIG. 1 can be arranged to drive a radar level gauging system.

FIG. 2 illustrates schematically how the timing circuit 1 can be arranged to drive a fluid level gauging radar system 9. The radar system 9 comprises a transmitter, a receiver and a directional antenna 10, which protrudes into a tank 11, the fluid level 12 of which is to be gauged. The reference clock output signal TX generated by the timing circuit 1 is used to control the transmitter to transmit a sequence of radio frequency (RF) bursts 13 via the antenna 10. The second clock output signal RX generated by the timing circuit 1 is used to control the gating of the receiver such that echoes 14 are sampled with different delays for each RF burst transmitted. Hereby the timing circuit 1 enables the fluid level gauging radar system 9 to sweep the entire range to be gauged in order to obtain echo signals for each distance corresponding to the time difference between the transmission of an RF burst and the associated sampling of the receiver. Hereby a time expanded signal representing magnitude of the echoes obtained from the entire range can be produced, from which distances to echoes of interest easily can be obtained.

A method for generation of trigger signals for a radar level gauging system in accordance with the present invention comprises the steps of: providing a pulse-repetition-frequency clock pulse to a pulse width modulator 3; using an edge of an output clock pulse RX from the pulse width modulator 3 to trigger a monostable multivibrator 4 to output a fixed width clock pulse TX having one common edge with the output clock pulse RX from the pulse width modulator 3; obtaining average voltages related to the duty cycles of the output clock pulses RX, TX from the pulse width modulator 3 and the monostable multivibrator 4; controlling the delay of the output clock pulse RX from the pulse width modulator 3 with respect to the output clock pulse TX from the monostable multivibrator 4 by regulating the average voltages. According to the method it is further suggested to control the delay of the output clock pulse RX from the pulse width modulator 3 with respect to the output clock pulse TX from the monostable multivibrator 4 by applying a voltage ramp CTRL. The step of obtaining average voltages is performed by passing the output clock pulses RX, TX from the pulse width modulator 3 and the monostable multivibrator 4 through a respective integrator 5, 6. Delay of the output clock pulse RX from the pulse width modulator 3 with respect to the output clock pulse TX from the monostable multivibrator 4 is controlled by providing a control loop to a control port of the pulse width modulator 3. In a preferred application the method further comprises the step of applying the output RX and TX clock pulses to drive a radar level gauging system.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, the timing circuit and method in accordance with the present invention could possibly also be applied to drive laser level gauging systems. Further, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A timing circuit for generation of trigger signals for a radar level gauging system comprising:
   a pulse-width modulator, having an input connected to a pulse-repetition-frequency generating oscillator,
   a monostable multivibrator, having an input connected to an output of the pulse-width modulator,
   first and second integrators connected to an output of the pulse-width modulator and the monostable multivibrator respectively,
   a voltage summation element, connected to an output of the first and second integrators respectively and at least one control signal input,
   a servo regulator providing a control loop between an output of the voltage summation element and a control port of the pulse-width modulator,
   wherein a reference clock output is provided at the output of the monostable multivibrator and a second clock output is provided at the output of the pulse-width modulator.

2. The circuit of claim 1, wherein the monostable multivibrator is arranged to be triggered to deliver a fixed width pulse by a first pulse edge of a pulse output by the pulse-width modulator.

3. The circuit of claim 2, wherein the output of the monostable multivibrator is arranged to change state immediately upon being triggered and remain in that state for a fixed period of time.

4. The circuit of claim 1, wherein the second pulse edge of a pulse output by the pulse-width modulator is arranged to provide a delayed edge output signal and the second edge of the fixed pulse width output by the monostable multivibrator is arranged to provide a non-delayed reference edge output signal.

5. The circuit of claim 1, wherein the monostable multivibrator is arranged to be triggered to deliver a fixed width pulse by a first pulse edge of a pulse output by the pulse-width modulator, and the second pulse edge of a pulse output by the pulse-width modulator is arranged to provide a delayed edge output signal and the second edge of the fixed pulse width output by the monostable multivibrator is arranged to provide a non-delayed reference edge output signal.

6. The circuit of claim 1, wherein the output of the monostable multivibrator is arranged to change state immediately upon being triggered and remain in that state for a fixed period of time, and the second pulse edge of a pulse output by the pulse-width modulator is arranged to provide a delayed edge output signal and the second edge of the fixed pulse width output by the monostable multivibrator is arranged to provide a non-delayed reference edge output signal.

7. The circuit of claim 1, wherein the monostable multivibrator is arranged to be triggered to deliver a fixed width pulse by a first pulse edge of a pulse output by the pulse-width modulator, and the output of the monostable multivibrator is arranged to change state immediately upon being triggered and remain in that state for a fixed period of time, and the second pulse edge of a pulse output by the pulse-width modulator is arranged to provide a delayed edge output signal and the second edge of the fixed pulse width output by the monostable multivibrator is arranged to provide a non-delayed reference edge output signal.

8. The circuit of claim 1 further comprising a radar transmitter arranged to be triggered by the reference clock output and a radar receiver arranged to be triggered by the second clock output.

9. A method for generation of trigger signals for a radar level gauging system the method comprising the steps of:
   providing a pulse-repetition-frequency clock pulse to a pulse width modulator;
   using a first edge of an output pulse from the pulse width modulator to trigger a monostable multivibrator to output a fixed width pulse having one common edge with the
   first edge of the output pulse from the pulse width modulator;

obtaining average voltages related to the duty cycles of the output pulses from the pulse width modulator and the monostable multivibrator;

controlling the delay of the output pulse from the pulse width modulator with respect to the output pulse from the monostable multivibrator by regulating the average voltages .

10. The method of claim 9 wherein the delay of the output pulse from the pulse width modulator with respect to the output pulse from the monostable multivibrator is controlled by applying a voltage ramp.

11. The method of claim 9 wherein the step of obtaining average voltages is performed by passing the output pulses from the pulse width modulator and the monostable multivibrator through a respective integrator.

12. The method of claim 9 wherein the delay of the output pulse from the pulse width modulator with respect to the output pulse from the monostable multivibrator is controlled by applying a voltage ramp, and the step of obtaining average voltages is performed by passing the output pulses from the pulse width modulator and the monostable multivibrator through a respective integrator.

13. The method of claim 9 wherein the delay of the output pulse from the pulse width modulator with respect to the output pulse from the monostable multivibrator is controlled by providing a control loop to a control port of the pulse width modulator.

14. The method of claim 9 wherein the delay of the output pulse from the pulse width modulator with respect to the output pulse from the monostable multivibrator is controlled by applying a voltage ramp, and the delay of the output pulse from the pulse width modulator with respect to the output pulse from the monostable multivibrator is controlled by providing a control loop to a control port of the pulse width modulator.

15. The method of claim 9 wherein the step of obtaining average voltages is performed by passing the output pulses from the pulse width modulator and the monostable multivibrator through a respective integrator, and the delay of the output pulse from the pulse width modulator with respect to the output pulse from the monostable multivibrator is controlled by providing a control loop to a control port of the pulse width modulator.

16. The method of claim 9 wherein the delay of the output pulse from the pulse width modulator with respect to the output pulse from the monostable multivibrator is controlled by applying a voltage ramp, and the step of obtaining average voltages is performed by passing the output pulses from the pulse width modulator and the monostable multivibrator through a respective integrator, and the delay of the output pulse from the pulse width modulator with respect to the output pulse from the monostable multivibrator is controlled by providing a control loop to a control port of the pulse width modulator.

17. The method of claim 9 further comprising the step of applying the output pulses to drive a radar level gauging system.

* * * * *